UNITED STATES PATENT OFFICE.

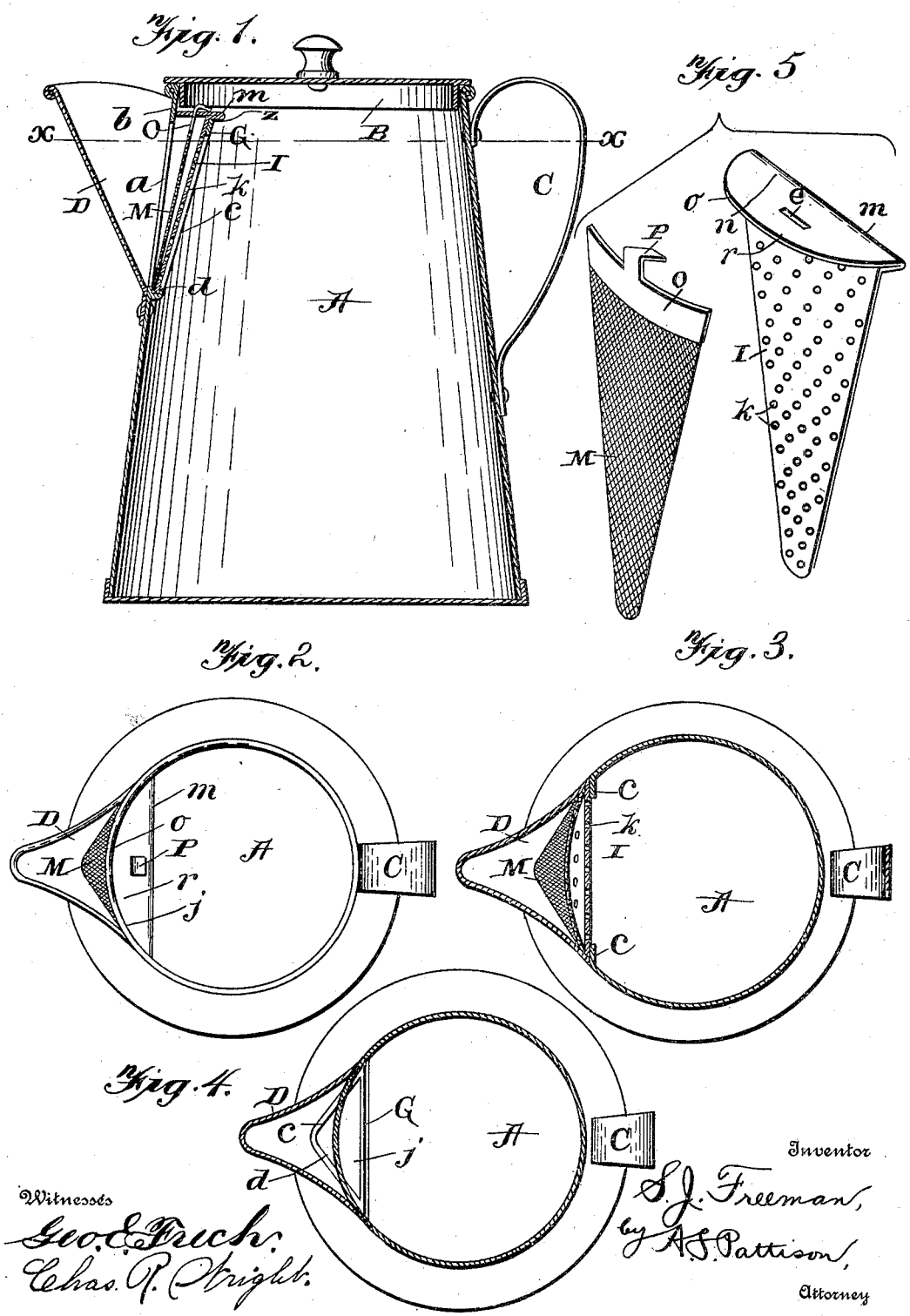

SIMON J. FREEMAN, OF BRADFORD, PENNSYLVANIA.

COFFEE OR TEA POT.

SPECIFICATION forming part of Letters Patent No. 691,052, dated January 14, 1902.

Application filed January 24, 1901. Serial No. 44,577. (No model.)

*To all whom it may concern:*

Be it known that I, SIMON J. FREEMAN, a citizen of the United States, residing at Bradford, in the county of McKean and State of Pennsylvania, have invented new and useful Improvements in Coffee or Tea Pots, of which the following is a specification.

My invention relates to improvements in coffee-pots, and pertains more particularly to that class provided with detachable strainers.

The object of my invention is to provide a coffee-pot in which the strainer can be readily attached or detached for the purpose of cleaning.

Another object of my invention is to provide a coffee-pot with an opening below its upper edge and surrounded by a spout so constructed that a strainer having two straining-surfaces may be detachably secured therein.

A still further object of my invention is to provide a strainer for a coffee-pot having a fine and a coarse strainer, the fine strainer being detachable from the coarse strainer, so that the coarse strainer can be used independent of the fine one, or both, as desired.

The invention consists in the novel construction and combination of parts to be hereinafter fully set forth.

Referring now to the drawings, Figure 1 is a longitudinal vertical sectional view of a coffee-pot constructed in the manner hereinafter described. Fig. 2 is a top plan view of Fig. 1 with the cover removed. Fig. 3 is a horizontal sectional view taken on line $x$ $x$ of Fig. 1 with the strainers in place. Fig. 4 is a horizontal sectional view with the strainers removed. Fig. 5 is a perspective view of the strainers.

Referring now to the drawings, A represents a coffee-pot of the ordinary shape, having a cover B and a handle C. The side of the pot opposite the handle has an opening $a$ cut therein below the upper edge of the pot, whereby an even unbroken upper edge is left for the cover to rest upon. The said opening being below the top edge of the pot leaves but a small web or strip $b$ thereabove, which serves a purpose to be hereinafter fully described. Secured to the pot on the outside by any desired means and surrounding the opening $a$ is a spout D, which extends to the upper edge of the pot or the web $b$. Surrounding the two approximately vertical walls and the lower wall of said opening $a$ on the inside is an inwardly-extending rib or ledge $c$, forming a groove or recess $d$ between it and the inner side of the spout. The said groove is adapted to receive the strainers and to partially support the same. The said rib only extends to the top of the opening $a$, and secured to the upper ends or top of said ribs is a straight horizontal transverse supporting-bar G, the upper edge Z of which is a trifle lower than the lower edge of the web or strip $b$, whereby an approximately semicircular opening $j$ is left between the transverse bar G and the web or strip $b$.

The strainer consists of a sheet-metal plate I of a shape to conform with the shape of the opening in the pot and adapted to rest within the grooves $d$, formed by the inwardly-extending ribs surrounding the opening. The said plate I of the strainer has its entire surface provided with large perforations $k$, which serve as a strainer, and said plate is continued at its upper end and bent rearwardly at right angles thereto, as at $m$, and is then again carried forward, as shown at $n$, upon the portion $m$ and extending forward at $r$ beyond the plate I and is rounded, as shown at $o$, to conform with the curve of the web $b$, so that it may firmly abut thereagainst. The rearwardly-extending portion $m$ rests upon the straight horizontal transverse bar, and the strainer is firmly held in place. A second strainer having its lower portion M shaped exactly like the plate I and made of fine netting is carried by the coarse strainer. Secured to the upper end of said netting is a transverse plate O, which carries an upwardly-extending tongue P, which is adapted to enter an opening $e$ in the transverse curved portion of the coarse strainer, the two straining-surfaces resting close together.

When the strainer is constructed as above set forth and is in place, with its lower portions within the groove formed by the inwardly-extending ledge $c$ and the portion $m$ resting upon the horizontal bar G and the curved or rounded portion resting against the curved web $b$, the strainer is firmly held against any movement. When the cover B is closed, it will engage the portion $r$ and firmly hold it from being forced out by the pressure of the contents of the pot thereon.

Having thus described my invention, what I claim, and desire to secure by Letters Patent, is—

1. The combination with a coffee-pot having an opening below its top, a spout surrounding said opening, of a straight horizontal bar extending across the pot adjacent the upper end of said opening, a strainer removably resting on said bar and carrying a second strainer, both adapted to cover said opening, substantially as described.

2. The combination with a coffee-pot, having an opening below its top, a spout surrounding said opening, a straight horizontal bar extending across the pot adjacent the upper end of said opening, of a strainer having a rearwardly-extending portion adapted to rest on said bar, and a forwardly-extending portion adapted to engage the curved portion of the pot, a second strainer carried by the forwardly-extending portion of the first strainer, substantially as described.

3. The combination with a coffee-pot having an opening below its top, a spouting surrounding said opening, and an inwardly-projecting ledge surrounding said opening and forming a groove, a straight horizontal bar extending across the pot adjacent the end of said opening, of a strainer resting within said groove and having a rearwardly-extending portion adapted to rest on said bar, and a forwardly-extending portion engaging the pot or rib left by the opening, and a second strainer resting within the groove and secured to the forwardly-extending portion of the first strainer, substantially as described.

4. A strainer for pots, comprising a vertical straining-surface, a horizontally rearwardly extending supporting-ledge, a forwardly-extending horizontal portion, and a second strainer supported by said forwardly-extending horizontal portion, substantially as described.

5. A strainer for pots, comprising a vertical straining-surface having its upper end bent at right angles thereto and rearwardly, and then bent upon said rearwardly-extending portion and extending forwardly having its outer edge rounded, and an opening therein, and a second vertical strainer having an upwardly-extending tongue adapted to enter the opening in the forwardly-extending portion of the first strainer and supported thereby, substantially as described.

In testimony whereof I have hereunto set my hand in the presence of two subscribing witnesses.

SIMON J. FREEMAN.

Witnesses:
 HERMAN H. NORTH,
 JAY NORTH.